(12) United States Patent
Orcutt

(10) Patent No.: US 6,185,575 B1
(45) Date of Patent: Feb. 6, 2001

(54) IN-PLACE DISK PARTITION CANONIZATION AND STORAGE OPTIMIZATION

(75) Inventor: Niel Orcutt, Pleasant Grove, UT (US)

(73) Assignee: PowerQuest Corporation, Orem, UT (US)

( * ) Notice: Under 35 U.S.C. 154(b), the term of this patent shall be extended for 0 days.

(21) Appl. No.: 09/115,196

(22) Filed: Jul. 15, 1998

Related U.S. Application Data

(60) Provisional application No. 60/026,585, filed on Sep. 19, 1996, and provisional application No. 60/054,269, filed on Jul. 30, 1997.
(51) Int. Cl.[7] .............................. G06F 17/00; G06F 12/02; G06F 12/00
(52) U.S. Cl. .......................... 707/200; 711/112; 711/113; 711/173
(58) Field of Search ..................................... 711/173, 112, 711/165, 170, 200; 707/202, 204

(56) References Cited

U.S. PATENT DOCUMENTS

| | | | |
|---|---|---|---|
| 5,398,142 | 3/1995 | Davy | 360/48 |
| 5,537,592 | 7/1996 | King et al. | 707/200 |
| 5,574,907 | 11/1996 | Jernigan, IV et al. | 707/1 |
| 5,655,119 | 8/1997 | Davy | 707/200 |
| 5,675,769 | 10/1997 | Ruff et al. | 711/173 |
| 5,706,472 | 1/1998 | Ruff et al. | 711/173 |
| 5,794,032 | * 8/1998 | Leyda | 713/2 |
| 5,829,045 | * 10/1998 | Motoyama | 711/162 |
| 5,930,828 | * 7/1999 | Jensen et al. | 711/170 |
| 6,035,379 | * 3/2000 | Raju et al. | 711/162 |

OTHER PUBLICATIONS

Custer, Helen, Windows NT File System, Microsoft Press, pp. 3, 24, 30–32, 49–51 and 76, 1994.*
"Verlustlos", 1995.
Japanese Patent Abstract, publication No. 04137126, published Dec. 5, 1992.
M. Russinovich, "Inside Windows NT Disk Defragmentation", Mar. 6, 1997, pp. 1–7.
"Diskeeper®for Windows NT™ Workstation" User's Guide, Executive Software, Feb. 1996, pp. 1–4.
"How Files become Fragmented", Diskeeper For Windows Info Pack, No later than Jun. 2, 1998, pp. 1–4.
"Next Generation Defragmentation for Windows NT", PerfectDisk NT, User's Manual, 1997, pp. i, 1–3.
M. Russinovich and B. Cogswell, "NTFSDOS", Feb. 3, 1997, Version 1.3R. pp. 1–4.
M. von Lowis, "The NTS Driver for Linux", NTFS for Linux (Alpha), No later than Oct. 15, 1997, p. 1.
"NTFS for Linux (Alpha)", No later than Jul. 14, 1997, p. 1.
"NT System Software Resources", Resources, No later than Jul. 14, 1997, pp. 1–2.
"PerfectDisk NT White Paper", *Raxco Software*, 1998, pp. 1–4.
"Norton Utilities 2.0 for Windows NT Factsheet", *Symantec*, Feb. 7, 1997, pp. 1–2.
"Window NT File Systems", No later than Jul. 16, 1997, p. 1.
"The Windows NT File System (NTFS)", No later than Jul. 16, 1997, pp. 1–2.

(List continued on next page.)

*Primary Examiner*—Hosain T. Alam
*Assistant Examiner*—Alford W. Kindred
(74) *Attorney, Agent, or Firm*—Computer Law [++]

(57) ABSTRACT

Methods and systems are provided for canonizing, defragmenting, and improving the storage efficiency of advanced file systems stored in one or more disk partitions. Partition and file manipulations are performed without destroying user data, making it unnecessary to copy data to tape or other intermediate storage and wipe the partition clean. Advanced file system features, such as relocatable file system structures and multiple data streams, are treated appropriately during the manipulations.

30 Claims, 3 Drawing Sheets

OTHER PUBLICATIONS

"Windows NT IFS Kit Backgrounder", Jun. 12, 1997, pp. 1–40.

"Windows NT 5.0 Sneak Peek", No later than Jul. 14, 1997, p. 1.

"What do you want to learn today?" Welcome to WarpedBoy.Com, No later than Jul. 14, 1997, p. 1.

"White Paper: Defragmentation and Window NT Performance Benefits", *Executive Software International*, 1997. pp. 1–6.

"Why Setup Reboots Three Times When Converting to NTFS", Microsoft Technical Support, *Microsoft Corporation*, May 8, 1997, pp. 1–3.

"Convert Examples", From Windows NT 4.0 Online help, pp. 1–7.

C. Jensen, "Fragmentation", Computer Disk, 1994.

Helen Custer, "Inside the Windows NT File System", *Microsoft Press*, 1994, pp. 1–91.

"Other Applications", 09/115,196 Filed Jul. 15, 1998; 1760.2.8A.

\* cited by examiner

IN-PLACE DISK PARTITION CANONIZATION AND STORAGE OPTIMIZATION

RELATED APPLICATIONS

The present application claims priority, directly or indirectly, to the following commonly owned copending U.S. patent applications: Ser. No. 60/026,585 filed Sep. 19, 1996; Ser. No. 08/932,530 filed Sep. 17, 1997; Ser. No. 08/834,004 filed Apr. 11, 1997; and Ser. No. 60/054,269 filed Jul. 30, 1997 (this last of which is incorporated by reference herein).

FIELD OF THE INVENTION

The present invention relates to in-place manipulation of a computer disk partition without archiving or destroying user data, and more particularly to in-place canonization and storage optimization of a partition which holds an advanced file system.

TECHNICAL BACKGROUND OF THE INVENTION

Computers utilize a wide variety of disks as storage media for user data. Disk technologies currently provide optical disks, magnetic disks, hard disks, floppy disks, and removable disks, and new disk technologies are being actively researched and developed. Indeed, some disks used by computers in the future may be cubical or some other shape rather than flat and circular.

FIG. 1 illustrates a disk 100 attached to a disk drive 102. The disk 100 illustrates physical characteristics of both floppies and hard disks; flash memory, cubical disks or other disks may appear in different configurations than the one shown here. The disk 100 contains a number of concentric data cylinders such as the cylinder 104. The cylinder 104 contains several data sectors, including sectors 106 and 108. The sectors 106 and 108 are located on an upper side 110 of the disk 100; additional sectors may be located on a lower side 112 of the disk 100. The sides 110, 112 of the disk 100 define a platter 114. A hard disk may contain several platters. The upper side 110 of the disk 100 is accessed by a head 116 mounted on an arm 118 secured to the drive 102. Optical or cubical disks may be accessed by other means, such as photoemitters or photoreceptors, and flash memory or other memory disks are accessed by electronic circuits familiar to those of skill in the art.

A given sector on the disk 100 may be identified by specifying a head, a cylinder, and a sector within the cylinder. A triplet specifying the head number, cylinder number, and sector number in this manner is known as a "physical sector address." Alternatively, a given sector may be identified by a logical sector address, which is a single number rather than a triplet of numbers.

Many disks mold the available space into one or more partitions by using a partition table located on the disk. A wide variety of partitions are used, and more partition types will no doubt be defined over time. Many partitions reside on a single disk, but some use volume sets, stripe sets, mirror sets, or other approaches to store a single partition's data on more than one disk. A partial list of current partitions and their associated file systems is given in U.S. patent application Ser. No. 08/834,004, filed Apr. 12, 1997, and incorporated here by reference. The list includes a variety of 12-bit, 16-bit, and 32-bit FAT file systems and numerous other file systems.

A file system of particular interest here is the NT File System ("NTFS"). Discussions of NTFS are provided in "Inside the Windows NT File System", by Helen Custer, ISBN 1-55615-660-X, as well as in marketing and technical materials available in hard copy and on the Internet from Microsoft Corporation and other sources. Those of skill in the art will note that these discussions sometimes involve unimplemented specifications or mere speculations.

NTFS contains advanced file system features which make it more complex or difficult to manipulate NTFS partitions than it is to manipulate partitions organized by many existing FAT file systems. More precisely, NTFS combines features such as the use of a database paradigm to support indexing of file attributes; multiple data streams per file; blurring of the distinction between system and user areas; recoverability by use of a log; recoverability by use of transactions; support for large disks; security descriptors constraining access to file objects; Unicode names; support for POSIX features such as links; bad cluster remapping; caching support; virtual memory support; system structure compression; balanced tree directory structures; support for volume spanning, volume sets, stripe sets, mirror sets, and other features which divide a file system's contents between disks or partitions; and/or a relocatable system area. "Attributes" are also known as "data streams"; some advanced file systems allow a single file to hold multiple data streams.

One partition table composition, denoted herein as the "IBM-compatible" partition table, is found on the disks used in many IBM® personal computers and IBM-compatible computers (IBM is a registered trademark of International Business Machines Corporation). IBM-compatible partition tables may be used on a wide variety of disks, with a variety of partition and file system types, in a variety of ways. In particular, the partition table format may be changed without necessarily changing file system formats, and vice versa.

As shown in FIG. 2, one version of an IBM-compatible partition table 200 includes an Initial Program Loader ("IPL") identifier 202, four primary partition identifiers 204, and a boot identifier 206. As shown in FIG. 3, each partition identifier 204 includes a boot indicator 300 to indicate whether the partition in question is bootable. At most one of the partitions in the set of partitions defined by the partition table 200 is bootable at any given time but "boot management" tools are commercially available to facilitate booting from different partitions.

Each partition identifier 204 also includes a starting address 302, which is the physical sector address of the first sector in the partition in question, and an ending address 304, which is the physical sector address of the last sector in the partition. A sector count 306 holds the total number of disk sectors in the partition. A boot sector address 308 holds the logical sector address corresponding to the physical starting address 302. Additional partition information may be stored in a disk administrator utility or other location outside the partition table, or in an enhanced partition table, particularly when partitions are allowed to span disks.

Some IBM-compatible computer systems allow "logical partitions" as well as the primary partitions just described. All logical partitions are contained within one primary partition; a primary partition which contains logical partitions is also known as an "extended partition."

Each partition identifier 204 also includes a system indicator 310. The system indicator 310 identifies the type of file system contained in the partition, which in turn defines the physical arrangement of data that is stored in the partition on the disk 100 (FIG. 1). For instance, the system indicator may indicate that data is organized in the partition according to some version of NTFS, with multiple data streams, a relocatable system area, and other features noted above. System indicator values not recognized by a particular operating system are treated as designating an unknown file system. The file system associated with a specific partition of the disk 100 determines the format in which data is stored in the partition, namely, the physical arrangement of user data and of file system structures in the portion of the disk 100 that is delimited by the starting address 302 and the ending address 304 of the partition in question. At any given time, each partition thus contains at most one type of file system.

An operating system manages access, not only to the disk 100, but to other computer resources as well. Resources typically managed by the operating system include one or more disks and disk drives, memory (RAM and/or ROM), micro-processors, and I/O devices such as a keyboard, mouse, screen, printer, tape drive, modem, serial port, parallel port, or network port.

It is sometimes desirable to alter the contents of a partition in-place without copying all necessary user and system data off the disk to a temporary storage location such as a tape or another disk and using FDISK or a similar tool. Inventions for in-place partition manipulation without destroying user data are described in U.S. Pat. Nos. 5,675,769 and 5,706,472, and in patent applications Ser. No. 08/932,530 and Ser. No. 08/834,004 (incorporated herein by reference). Software embodying the patented inventions is commercially available from PowerQuest Corporation of Orem, Utah.

However, the aforementioned patents do not teach comprehensive methods for canonizing NTFS partitions, that is, for relocating system files and other data to place them at or near predetermined positions within the partition. In addition, although the aforementioned patents provide useful methods for reclaiming storage space by changing cluster size and/or partition size, the patents do not present certain other methods for optimizing NTFS storage efficiency.

Thus, it would be an advancement in the art to provide an improved system and method for manipulating advanced file system partitions, such as NTFS partitions, in-place without destroying user data.

Such a system and method are disclosed and claimed herein.

BRIEF SUMMARY OF THE INVENTION

The present invention provides methods, articles, and systems for canonizing and optimizing partitions which hold advanced file systems. Methods of the invention are performed in-place, that is, without destroying user data by reformatting the disk or requiring the use of temporary intermediate storage on a tape or a supplemental disk.

The invention deals appropriately with advanced file system features such balanced directory trees, multiple data streams, relocatable system areas, and others, in various combinations. In particular, partitions containing various versions of the NTFS file system may be canonized or optimized. Storage optimization reduces wasted space by reclaiming (for system or user use) disk space that would otherwise not be available. Canonization relocates system files to a standard location, and may defragment files as well. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
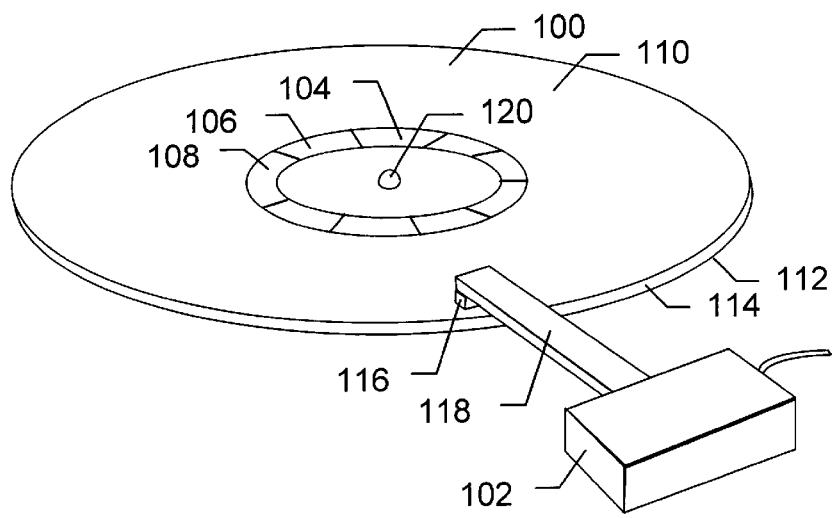
FIG. 1 is a partial cut-away view of a computer disk.
Figures 2, 3:
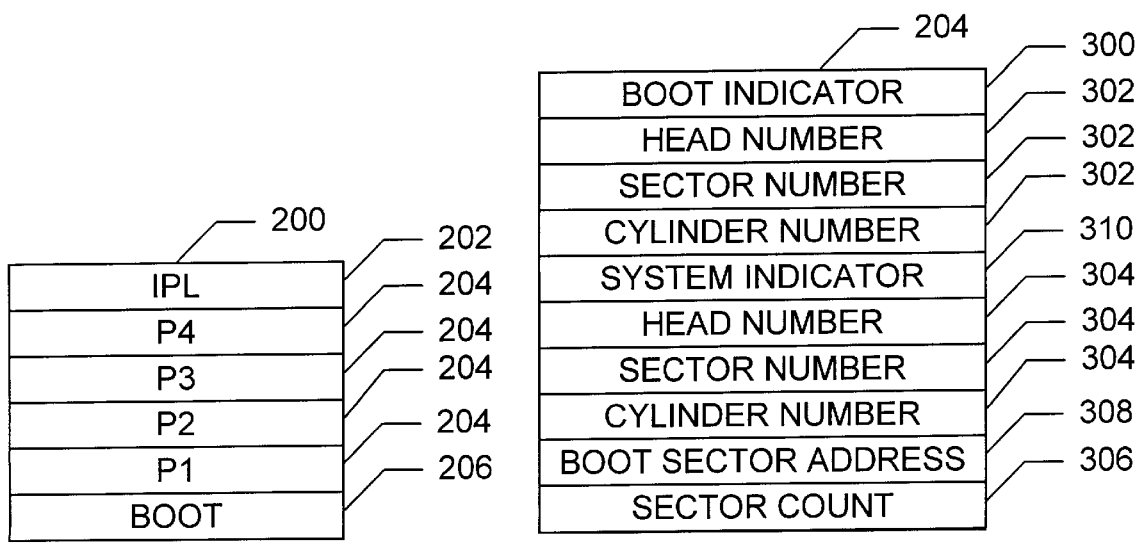
FIG. 2 is a diagram illustrating an IBM-compatible partition table.
FIG. 3 is a diagram further illustrating a portion of the partition table shown in FIG. 2.
Figure 4:
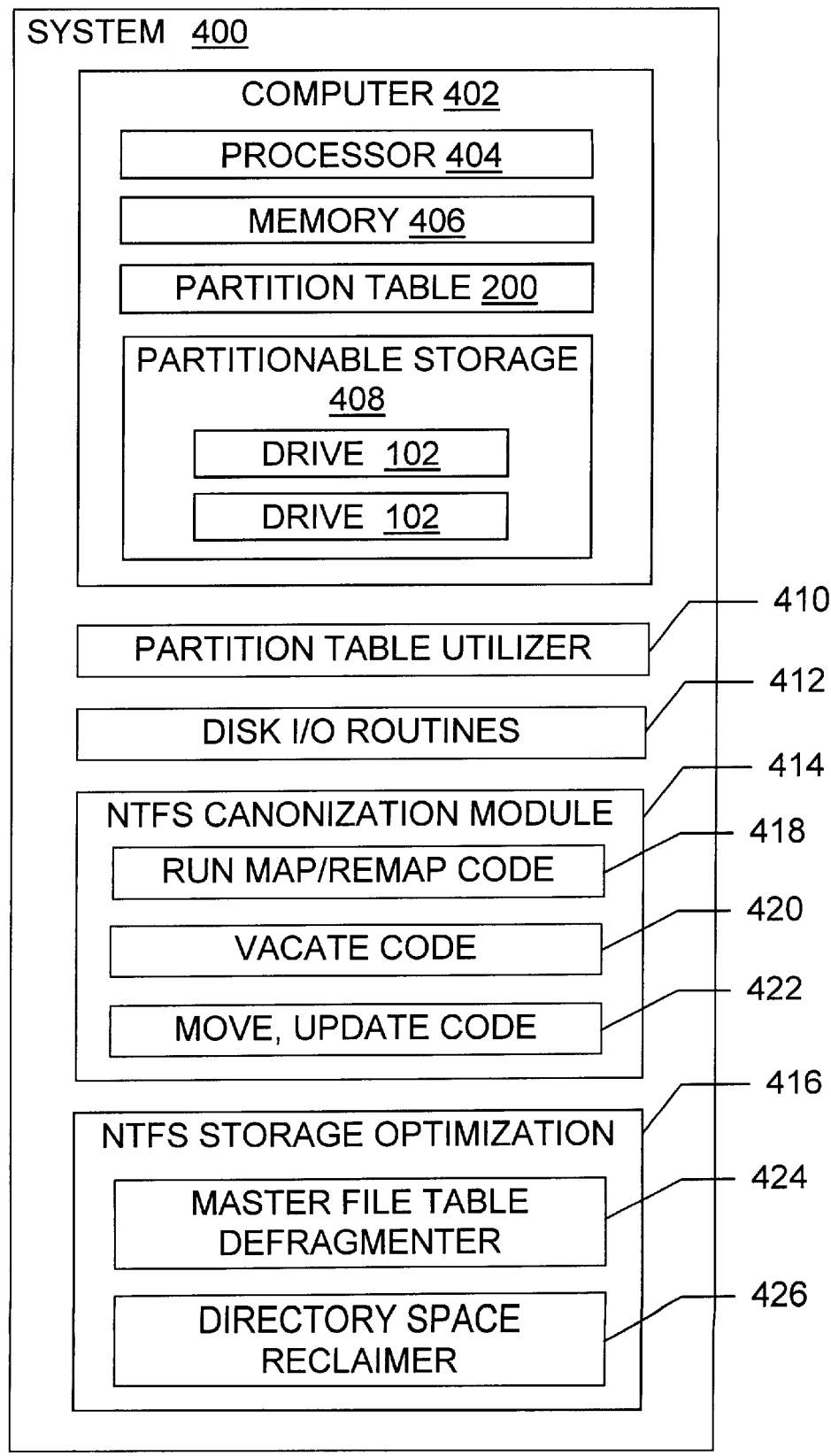
FIG. 4 is a diagram illustrating a system which implements the present invention.

One embodiment of the present invention manipulates NTFS partitions on a computer using a system such as the system 400 shown in FIG. 4. The system 400 includes at least one computer 402 which has a processor 404 for executing program instructions, a memory 406 for storing program instructions and data, and a partitionable storage medium 408 for holding data in sectors according to the partition table 200 (FIG. 2). The partitionable storage medium 408 includes one or more non-volatile storage devices such as magnetic or optical disk drives 102. The memory 406 and the partitionable storage medium 408 can be written and read by execution of appropriate processor 404 instructions, direct memory access, or other familiar means.

The illustrated embodiment includes one computer 402 but the methods of the present invention may be initiated, controlled, and/or monitored remotely from another computer, such as a server connected to the first computer 402 by a network, modem, or other familiar means. The computer 402 may itself be a server connected by network signal lines to one or more network clients, or it may be a network client, or it may be a standalone machine. A server computer 402 may be configured as an Internet server, as an intranet server, as a name server, as a file server, as an applications server, or as a combination thereof. A given computer 402 may also function both as a client and as a server; this may occur, for instance, on computers 402 running Microsoft Windows NT software (WINDOWS NT is a mark of Microsoft Corporation). The processor 404 may be a uniprocessor or a multiprocessor. Suitable computers 402 include, without limitation, personal computers, laptops, and workstations. Although particular computer system 400 components are identified herein, those of skill in the art will appreciate that the present invention also works with a variety of other systems 400.

The system 400 also includes a partition table utilizer 410 which is capable of extracting from the partition table 200 information such as partition boundaries, partition sizes, partition types, and whether a partition is bootable. The partition table utilizer 410 is also capable of modifying the partition table 200 to reflect changes in such information (once the changes are specified to the utilizer 410), and of performing the modifications subject to locks and/or semantic constraints to maintain the integrity and self-consistency of the data stored in the partition table 200.

In some embodiments, no changes are made to partition size or other partition table data, so the partition table 200 is read (to identify selectable partitions) but is not written. For instance, partition canonization, file defragmentation, and storage optimization can be performed without changing partition data kept in the partition table 200. In other embodiments, partition canonization, file defragmentation, and/or storage optimization are combined with manipulations such as partition resizing that require updates to the partition table 200.

As used herein, "partition canonization" is shorthand for a phrase such as "canonization of the storage format of an instance of a file system which is stored in one or more partitions." That is, partition canonization is primarily concerned with the storage format of a file system within one or more partitions, rather than the storage format of a partition within one or more disks. File systems and partitions are often, though not always, in one-to-one correspondence. A file system often resides in a single partition, but may also span partitions. For instance, volume sets, stripe sets, or other approaches may coordinate file system elements in more than one partition to present the user with an interface to a single file system. Likewise, a partition often contains a file system, but need not do so. For instance, a partition may be empty, or it may contain a stream or block of raw data without any directories, file allocation tables, bitmaps, or similar file system structures.

"Partition canonization" might also be called "file system canonization," since the entity being canonized is a file system which resides in a volume. The volume may include one or more partitions on one or more disks. An "NTFS partition" or "NT file system partition" is thus a partition in a volume containing an NTFS file system.

The partition table utilizer 410 may be embodied in software which runs on the computer 402 and which reflects the semantic constraints imposed on partitions. Perhaps the simplest such constraint is that no sector belongs to two primary partitions or to two logical partitions. Other semantic constraints on partitions are also well-known. The partition table 200 and an executable copy of the partition table utilizer 410 may be stored on one of the disk drives 102 in the partitionable storage 408, but are shown separately for clarity of illustration.

A set of disk input/output routines 412 is used by the partition table utilizer 410 and other components of the system 400 to access user and system data on the drive 102. Suitable routines are well-known to those of skill in the art, regardless of their familiarity with NTFS, at least with respect to simple sector V/O. More sophisticated routines 412 provide NTFS volume bitmap and Master File Table bitmap access, status information such as whether a reboot is needed to update operating system structures or gain a lock, interfaces with operating system locks to provide exclusive access to disk contents, access to boot sectors and backup boot sectors, access to bad sector lists, management of NTFS File Record Segments, directory operations such as list or create or delete, access to file and cluster size information, access to volume flags and logical cluster number information, and similar information. Such routines may be implemented using software and hardware familiar to those of skill in the art, with particular reference to the documented structure and operation of NTFS and its associated operating systems in view of the teachings of the present invention.

One or more selected partitions in the storage medium 408 may be canonized or storage optimized to produce corresponding modified partition(s). During such operations it is often necessary to move user or system data from one location to another in the medium 408 and to update NTFS system structures. Such operations preferably move the data and file system structures as little as necessary. They also preferably always keep at least one copy of user data and system information stored on disk, in case the partition manipulation is interrupted by an event that requires rebooting.

The user data and system structures are copied, moved, and/or updated, as necessary, under the direction of an NTFS canonization module 414 and/or an NTFS storage optimization module 416. Each module 414, 416 manipulates system and user data in place in a selected partition to produce a corresponding modified partition, taking into account special characteristics and requirements of the NTFS file system used in the partition. Software which embodies part or all of the modules 414, 416 may be loaded for execution from a drive 102 on the computer 402 that holds the selected partition, or the software may be loaded over a network or other connection from a file server or some other computer 402.

One might argue there is no modified partition until the partition table 200 is updated, even if all the disk sectors that will lie in the modified partition have been updated to contain appropriate file system structures and user data, because partitions are defined by entries in the partition table 200. However, for convenience the term "modified partition" means "intended or actual modified partition(s)." That is, "modified partition" is used to denote both the partition (or partitions if the file system spans partitions) produced from the selected partition(s) and the collection of disk sectors which the modified partition(s) are meant to occupy. Accordingly, one may speak of modified partitions, based on identified selected partitions and one or more identified operations to be performed on the selected partition(s), even before the partition table 200 is updated. Indeed, one or more modified partitions may exist even if no update to the partition table 200 is needed, as when the partition is merely canonized, defragmented, or optimized without being resized.

Figure 5:
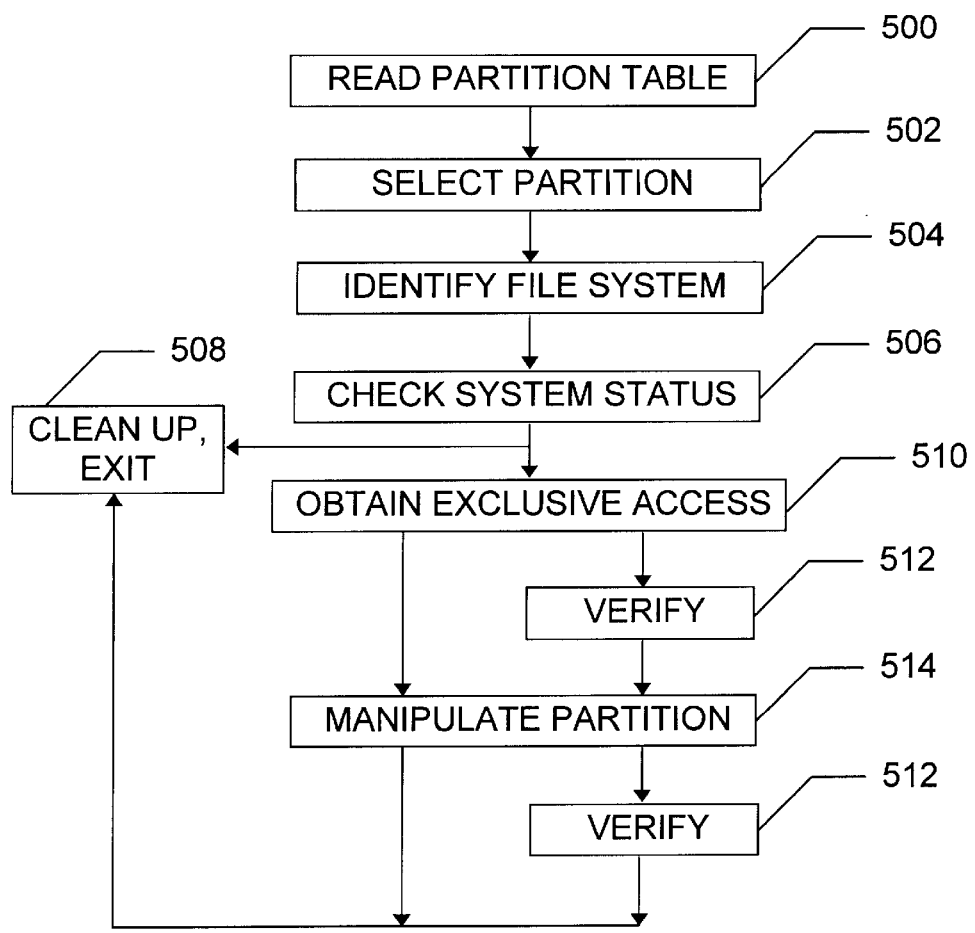
FIG. 5 is a flowchart illustrating methods of the present invention.

A method of the present invention is illustrated in FIG. 5, with continued reference being made to the earlier Figures. During a reading step 500, the partition table utilizer 410 reads the partition table 200 from the storage medium 408 into a memory structure, such as a C or C++ struct, a Pascal record, or the like. During a selecting step 502, a partition is selected. This may be performed automatically by software driving the canonization module 414 or the storage optimization module 416, or it may be done interactively by a human user using an interface such as a graphical user interface (GUI). The present invention focuses on manipulation of logical or primary NTFS partitions, since canonization and storage optimization have little relevance to extended partitions.

During an identifying step 504, the file system being used in the selected partition is identified by checking the system indicator 310. The system indicator may identify an advanced file system such as NTFS. However the step 504 may also identify a proprietary or in-progress partition which indicates that partition manipulation was interrupted, such as a recovery partition indicator. If a recovery partition indicator is present, recovery proceeds by either backing out all changes or by continuing the manipulation from the last logged checkpoint. For ease of illustration, we concentrate on the case in which the file system identified during the step 504 is an NTFS file system.

During a checking step 506, the file system status is checked to determine whether the system 400 is in a known state, that is, a state in which necessary assumptions about file system structures hold true. Presence of a recovery partition indicator does not necessarily indicate an unknown state; the state may be unknown to conventional operating system or file system software but known to an embodiment of the present invention. In NTFS, the system 400 is presumed to be in an unknown state if a volume's "dirty bit" is set. The dirty bit may be set, for instance, if power to the computer 402 is shut off before the file and operating systems have shut down, or if a disk I/O operation is interrupted.

It may be possible to move the system 400 into a known state by rolling back operations logged in a log file by a transactional file system, using ChkDsk, or other means. However, it is presently preferred that partition manipulation software according to the invention simply clean up and exit during a step 508 if the system 400 is in an unknown state, and that the NTFS log file be treated as if it were a user data file. In particular, one embodiment of the invention does not attempt to update, flush, or otherwise modify the log file contents, since they are reinitialized each time the file system software successfully exits and restarts.

Cleaning up involves releasing temporarily allocated memory or disk space, replacing any recovery partition indicator with a conventional value, and otherwise placing the partition in a condition that presents no unpleasant surprises to ChkDsk or to the user.

During a step 510, software embodying the invention gains exclusive access to the partitionable storage medium, or at a minimum to the part of that medium that holds (or will hold) the selected partition and the modified partition. For instance, NTFS caching and virtual memory must be disabled, or at least restricted, to prevent any inconsistency between sector locations that are indicated in the memory 406 and the actual location of the sectors on the drive 102. This could be accomplished by flushing and then disabling the cache. In one embodiment, exclusive access is obtained by performing critical disk operations under the DOS operating system instead of under the Windows NT operating system. In another embodiment, exclusive access is obtained by running partition manipulation software before the boot process initializes virtual memory and caching subsystems of the system 400.

A verifying step 512 may be performed before and/or after a partition manipulating step 514 to check the internal consistency and integrity of file system structures in the selected partition. Suitable verifying steps 512 include steps performed by commonly used tools such as ScanDisk and ChkDsk. Some advanced file systems, including NTFS, include redundant copies of system information. This may be done by repeating structures such as the boot sector, or by storing the same information in different ways in different system structures, such as placing allocation information in both a bitmap and in system structures. The verifying step 512 preferably checks the internal consistency of all redundant copies of system information, in addition to checking the integrity of the system in other ways.

Figure 6:
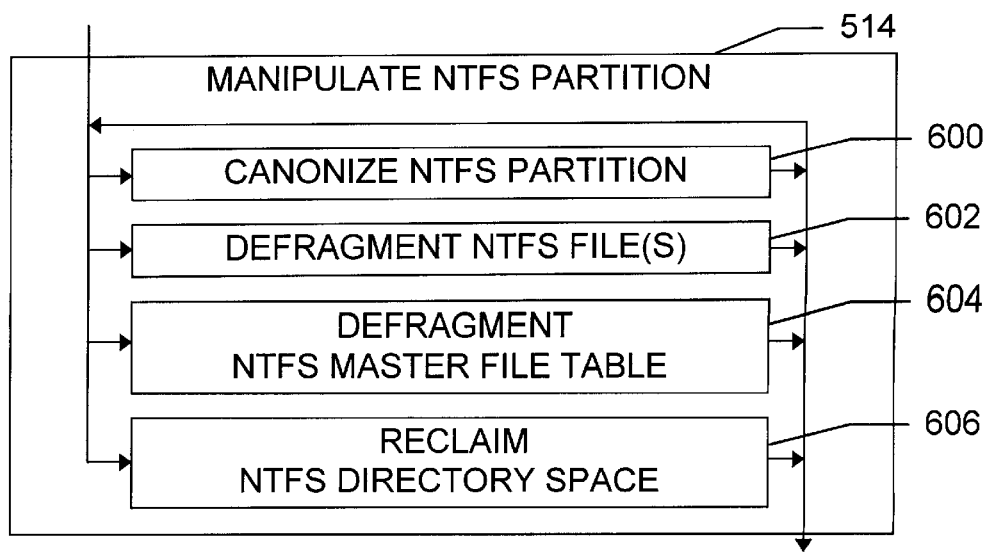
FIG. 6 is a flowchart further illustrating a partition manipulating step of the method shown in FIG. 5.

As illustrated in FIG. 6, when the partition manipulating step 514 operates on a selected NTFS partition it may canonize the partition by relocating system files during a step 600, defragment one or more files in the partition by relocating runs during a step 602, optimize storage by defragmenting the Master File Table during a step 604, and/or reclaim directory space during a step 606. A run is a group of one or more contiguous clusters in a file. The partition manipulating step 514 may also fix file system errors detected during the verifying step 512 and/or perform partition manipulations of the type discussed in U.S. Pat. Nos. 5,675,769 and 5,706,472.

One embodiment of the invention performs the canonization step 600 in conjunction with the general defragmentation step 602. This embodiment places an NTFS partition in canonical form for version 4.0 of the Windows NT operating and file systems. When Windows NT 4.0 formats an NTFS partition, it lays the partition out in the following canonical form:

1. The boot information and boot loader occupy the 8k bytes of the partition or the first cluster, if the cluster size is greater than 8k bytes.

2. If the first sector on the partition is bad, the boot information is written in the first area that contains 8k or one cluster, whichever is larger, of good space and the values in the backup boot sector at the end of the partition are updated to run the boot loader program from the non-standard location. NTFS allocates bad clusters to the bad cluster file in a sparse file format when those clusters are identified as bad during an initial FORMAT invocation. The sparse file format recalls the sparse file approach used in UNIX and POSIX systems. Bad sectors may also be found during ordinary use of the file system when an attempt is made to access data. Bad clusters are added to the bad cluster file in a compressible sparse file format.

3. The Master File Table usage bitmap and its reserved space occupy the cluster on the partition after the boot loader.

4. If the cluster size is less than 8k bytes, the space between this cluster and 16k bytes (8k bytes for the boot record and 8k bytes for the usage bitmap) is reserved for expansion of the Master File Table usage bitmap.

5. The Master File Table occupies the next 16 * File-Record-Size bytes or one cluster, whichever is larger, after the usage bitmap and its reserved space.

6. The space between the end of the Master File Table and ⅛ the partition size is reserved for expansion of the Master File Table.

7. If the cluster size is smaller than the File Record Size, the Backup Master File Table is placed so that the first sector in its last cluster occupies the center cluster on the partition. This is done because the Backup Master File Table contains copies of four File Records but only the first three are needed to restore the File Table. If Windows NT 3.x is booted, its initial check of the partition will place a copy of the first sector of the Boot Record on the center sector of the partition, which will destroy the fourth backup File Record (NT 4.0 and above keep the backup boot information in a sector after the end of the partition).

8. If the cluster size is larger than or equal to the File Record Size, the center cluster on the partition is left free and the Backup Master File Table is placed in the cluster following the center cluster. If Window NT 3.x is booted, its initial check of the partition will place a copy of the first sector of the Boot Record on the center sector of the partition, which is somewhere in the center cluster that was left free.

9. Any data in the rest of the system files that does not fit with each file's File Entry is placed in the clusters after the Backup Master File Table in the order: Log File, Volume Description Files, Attribute Definition File, Volume Bit Map File, Quota Table, Uppercase Table, and Root Directory.

10. For system files other than the boot file, if there are clusters containing bad sectors on the partition where the file would ordinarily be placed, these are skipped and file placement proceeds at the next cluster after the cluster containing bad sectors. Thus, the data in the system files may be fragmented if it surrounds bad sectors.

11. User data is placed on the partition after the reserved area starting at ⅛th the partition size and proceeding to the end of the partition, skipping bad sectors and the system files at the center of the partition.

12. If the user data fills the partition between ⅛th the partition size and the end, the free space after the Master File Table and the Master File Table usage bitmap is used for user files.

Because the NTFS device driver is so complex and because the software used to install Windows NT does not manage large amounts of memory, Windows NT cannot be installed onto an NTFS partition directly. When a user selects installation onto an NTFS partition, the install program creates a FAT partition and installs Windows NT to it. It then uses NTs boot-time program launcher to run the CONVERT program from within Windows NT. This program converts the FAT partition to an NTFS partition that has a very different layout than that described above. In addition, sophisticated users can run Windows NT's CONVERT utility directly to produce NTFS partitions from FAT partitions, again with the non-standard layout.

The invention canonizes partitions for NTFS and Windows NT 4.0 by restoring them to the format described above. One embodiment for canonizing partitions includes a defragmentation program that restores a partition to the standard layout as it defragments the partition. It does this whether the partition was created by the Windows FORMAT function or by CONVERT. To the inventor's knowledge, this has not been done for NTFS and other file systems having characteristics like those identified above, although some FAT utilities do allow users to choose the order or location of certain FAT system files to make FAT file system access faster.

More precisely, one embodiment includes code such as the code described below. Other embodiments also lie within the scope of the claims.

A RUN_REMAP_ENTRY structure tracks information about a run of clusters in a file. The structure includes a pointer or index to the next entry in a list or array of such structures, a file identifier such as a file number, an attribute type indicator, an attribute name CRC, a count indicating the number of clusters in the run, a virtual cluster number indicating the position of the run in the file, a logical cluster number specifying the current beginning of the run, and a target logical cluster number specifying the new beginning location for the run. The CRC (cyclic redundancy code) saves memory by storing a representation of an NTFS named data stream as a four-byte longword instead of using the Unicode name, which can be up to 510 bytes long. In alternative embodiments, the stream name may be used instead of the CRC.

A RUN_REMAP class contains data and member functions for remapping runs. The class data includes a map rrMap in the form of an array of RUN_REMAP_ENTRY structures and an indication of the array's size, a Boolean indicating whether cluster numbers are wrapping around to positions before a point one-eighth into the partition, a delta specifying the range of canonical locations for system files, a count indicating the number of free clusters available for temporary use during a cluster remapping operation, a logical cluster number specifying the cluster one-eighth of the way into the partition from the left (typically the lowest sector address) edge, a logical cluster number specifying the first cluster after the Master File Table, and a logical cluster number specifying the target beginning position during remapping.

The RUN_REMAP class functions include inline function RUN_REMAP( ) for allocating and initializing (rerun map size zeroed, wrapping false), void SetFirstFree(SLCN slcnNewFirstFree) for setting the first cluster after the Master File Table, void SetStart(SLCN slcnNewStart) for setting the cluster at the one-eighth point, void SetRemapAddr (SLCN slcnNewAddr) for setting the target cluster and setting wrapping false, void SetDelta(ULONG ulNewDelta) for setting the system file remap position delta, void SetFreeClusts(ULONG ulNewFreeClusts) for setting the number of free clusters, ULONG GetMapSize(void) for returning the map size, SLCN GetRemapAddr(void) for returning the target logical cluster number, and RUN_REMAP_ENTRY *GetMapEntry(int n) for returning a specified map entry.

The RUN_REMAP class also includes these functions: MapRun( ) for mapping a run, RemapRunso for remapping an attribute's runs, ReRemapRun( ) for re-remapping a run, AddMappingo for adding a mapping, RemapAttrByHeader( ) for remapping a file attribute using an attribute record header, RemapAttrByEntry( ) for remapping a file attribute using an attribute list entry, RemapSysAttr( ) for remapping a system attribute, and Vacate( ) for vacating clusters from an area on disk without losing user data. These functions are described in greater detail below.

The MapRun( ) function for mapping a run takes the following parameters: a pointer to an object that contains file attribute data and member functions, a virtual cluster number specifying the run's position in the file, a logical cluster number specifying the run's position on disk, a cluster count specifying the run's length, and an index into rrMap specifying the insertion point if it is not at one end. For each cluster in the run, the function first determines whether the run is in a forbidden region. Regions may be forbidden because they contain bad sectors, or they may be temporarily forbidden to reserve them for system files. If the beginning of the run is in a forbidden region, then the target address is moved to just after the run. When the right edge of the partition is reached, one run may be wrapped once back to the beginning of the partition; if further attempts are made to wrap a run, the function returns an error code indicating the partition is full. If part of the run after the beginning is in a forbidden region, as many clusters will be mapped as possible. The presence of unmerged adjacent forbidden regions is treated as an error. Individual runs are mapped using the AddMapping( ) function described herein.

The RemapRuns( ) function for remapping an attribute's runs takes as a parameter a pointer to an object that contains file attribute data and member functions. If the attribute is resident, the function simply returns a success code. Otherwise, for each run in the attribute the function maps the run using the MapRun( ) function described herein.

The ReRemapRun( ) function is used for re-remapping a run in an attribute after the MoveRun( ) or MoveRun2( ) function is called. The ReRemapRun( ) function parameters are a pointer to an object that contains file attribute data and member functions (the attribute to remap), and an index into rrMap. The function saves the target logical cluster number specified in rrMap at the indexed location and deletes the entry being remapped. For each cluster in the entry, the function used the AddMapping( ) function to add the cluster to the map.

The AddMapping( ) function for adding a mapping takes the following parameters: a file number, an attribute type, an attribute CRC, a cluster count, a virtual cluster number specifying a run's position in the file, logical cluster numbers specifying the current and target positions of the run, and an index or pointer into an array or list of mappings specifying the insertion point if it is not at one end of the array or list. The function adds the mapping, making room in the array or list at the indicated position if necessary.

The RemapAttrByHeader( ) function for remapping a file attribute using an attribute record header takes as parameters a pointer to an object containing information about a file record segment containing the attribute and a pointer to an object containing attribute record header information. The header information is used to open the attribute. If the attribute is nonresident, the function invokes the RemapRuns( ) function on the attribute and then closes the attribute.

The RemapAttrByEntry( ) function for remapping a file attribute using an attribute list entry takes as parameters a pointer to an object containing information about a file record segment containing the attribute and a pointer to an object containing attribute list entry information. The list entry information is used to open the attribute. If the attribute is nonresident, the function invokes the RemapRuns( ) function on the attribute and then closes the attribute.

The RemapSysAttr( ) function for remapping a system attribute takes the following parameters: a pointer to an object containing information about the volume containing the attribute, the file number of the attribute, the attribute type, the attribute name, and a Boolean indicating whether to remap or to suppress remapping. If remapping is suppressed, the function merely puts an entry in the mapping table rrMap. If the runs in an attribute are not within a few clusters of the insert point or the runs are not contiguous, then the function enters a remap operation for the runs. More precisely, the function starts by opening the file record segment and the attribute. If the attribute is resident, the file record segment and the attribute are closed and the function returns. Otherwise, if remapping is suppressed then an entry is made by calling AddMapping( ) for each run in the attribute. If remapping is not suppressed then RemapRuns( ) is called. In either case, the function ends by closing the file record segment and the attribute.

To illustrate the Vacate( ) function and simultaneously provide a sample of error detection and handling, typing, and other implementation details, one embodiment of the Vacate( ) function is provided below.

```
//----------------------------------------------------------------------------
// Move clusters out of a given region.
//----------------------------------------------------------------------------
PQRET RUN_REMAP::Vacate(
        NTFS_VOLUME *pVol,          // Volume
        SLCN slcnBegin,             // Area being vacated
        ULONG ulCount)
{
        PQRET pqRet;
        PQRET pqRet2;
        NTFS_FRS *pFrs = NULL;          // An FRS (file record segment)
        NTFS_ATTRIBUTE *pAttr = NULL;   // An attribute (data stream)
        RUN_REMAP_ENTRY *pEntry;        // Ptr. to a run to remap
        RUN_LIST *pFRun;                // Ptr. to RUN_LIST version of run
        RUN *pRun;                      // Argument to MoveRun( )
        STATE_MAP *pBitmap;             // Pointer to current bitmap
        SLCN slcnEnd;                   // End of vacate area
        SLCN slcnRunEnd;                // End of current run
        ULONG ulType;                   // The type of the *pNthAttr
        ULONG ulNameCrc;                // The name CRC of the *pNthAttr
        UINT i;                         // Misc. loop counter
        BOOL bNew;                      // TRUE if this is the first time
        BOOL bFrsDirty;                 // TRUE if an FRS has changed
        BOOL bAttrDirty;                // TRUE if an attribute has changed
        pFRun = pVol—>AddForbiddenRegion(slcnBegin, ulCount);
        pBitmap = pVol—>GetBitmap( );
        ulType = 0;
        bFrsDirty = FALSE;
        bAttrDirty = FALSE;
        bNew = TRUE;
        slcnEnd = slcnBegin + ulCount;
        for (  i = 0;
                i < GetMapSize( ) && pBitmap—>GetNextSet(slcnBegin) < slcnEnd;
                i++) {
                pEntry = &rrMap[i];
                slcnRunEnd = pEntry—>Begin + pEntry—>Count;
                if (pEntry—>Begin <= slcnBegin && slcnRunEnd >= slcnBegin ||
                        pEntry—>Begin < slcnEnd ** slcnRunEnd >= slcnEnd ||
                        slcnBegin <= pEntry—>Begin && slcnEnd > pEntry—>Begin) {
                        // this run must be vacated
                        if (bNew || pEntry—>FileNo != pFrs—>GetSegmentNum( )) {
                                if (bFrsDirty) {
                                        pqRet = pFrs—>Write( );
                                        if (pqRet != PQ_OK) goto Exit;
                                }
                                if (pFrs != NULL) {
```

-continued

```
            pqRet = pFrs—>CloseAttribute(&pAttr);
            if (pqRet != PQ_OK) goto Exit;
        }
        pqRet = pVol—>CloseFrs(&pFrs);
        if (pqRet != PQ_OK) goto Exit;
        pqRet = pVol—>OpenFrs(   pEntry—>FileNo,
                                 NTFS_FRS_READ_USED,
                                 &pFrs);
        if (pqRet != PQ_OK) goto Exit;
        bNew = TRUE;
    }
    if ( bNew ||
        pEntry—>Type != ulType ||
        pEntry—>NameCrc != ulNameCrc) {
        pqRet = pFrs—>CloseAttribute(&pAttr);
        if(pqRet != PQ_OK) goto Exit;
        pqRet = pFrs—>OpenAttributeByNameCrc(
                                 pEntry—>Type,
                                 pEntry—>NameCrc,
                                 &pAttr);
        if(pqRet != PQ_OK goto Exit;
        ulType = pEntry—>Type;
        ulNameCrc = pEntry—>NameCrc;
        bNew = FALSE;
    }
    pqRet = pAttr—>GetRun(   pEntry—>Pos,
                             NULL,
                             NULL,
                             NULL,
                             NULL,
                             &pRun);
    if (pqRet != PQ_OK) goto Exit;
    if (pRun—>slcnBegin < pEntry—>Begin) {
        // get rid of beginning of run
        pqRet = pAttr—>SplitRun(
                             pRun,
                             pEntry—>Begin – pRun—>slcnBegin);
        pRun = pRun—>Next       // use second portion
        if (pqRet != PQ_OK) goto Exit;
        if (pRun—>ulClusts == 0) continue;
    }
    if (pRun—>ulClusts > pEntry—>Count) {
        // get rid of extra part of run
        pqRet = pAttr—>SplitRun(pRun,pEntry—>Count);
        if (pqRet != PQ_OK) goto Exit;
    }
    pqRet = pAttr—>MoveRun(pRun, 0); // move the run in question
    if (pqRet != PQ_OK) goto Exit;
    // Reload the remaining run list entries for this attribute.
    pqRet = ReRemapRun(pAttr, i);
    if (pqRet != PQ_OK) goto Exit;
    bFrsDirty = TRUE;
        } // end if (run must move)
    } // end for
    pVol—>RemoveForbiddenRegion(pFRun);
    if (bFrsDirty) {
        pqRet = pFrs—>Write( );
        if (pqRet != PQ_OK) goto Exit;
    }
Exit:
    if (pqRet == PQ_OK && pBitmap—>GetNextSet(slcnBegin) < slcnEnd)
        pqRet = ERR_MOVE_INCOMPLETE;
    if (pFrs != NULL) {
        pqRet2 = pFrs—>CloseAttribute(&pAttr);
        if (pqRet == PQ_OK) pqRet = pqRet2;
    }
    pqRet2 = pVol—>CloseFrs(&pFrs);
    if (pqRet == PQ_OK) pqRet = pqRet2;
    return (pqRet);
} // end RUN_REMAP::Vacate( )
```

One partition manipulation main routine uses the RUN_REMAP class in a manner described below to manipulate NTFS partitions. In addition to the capabilities discussed below, various embodiments include code for updating progress bars in a graphical user interface, code for verifying that a valid NTFS partition is present, and/or code for detecting various conditions such as low memory, a partition with less than about 2 Megabytes of free space (needed to permit effective manipulation), bad clusters, cancellation by the user midway through a set of manipulations, and outof-range values in file record segments or other errors of the type noted by CHKDSK and similar consistency check programs.

In one embodiment, the main routine takes as its only parameter a pointer to an object containing information about the partition such as the partition's location, type (extended, logical, primary), and file system type (NTFS, FAT32, and so on; NTFS is of particular interest here). Internal data local to the routine include variables to receive return codes (OK, low memory, and so on); a pointer to an object containing information about the volume holding the partition; an NTFS file record segment; an NTFS attribute (data stream); a copy of the first four Master File Table records; and attribute header; a pointer to a list of attribute records; a pointer to a run to remap; a pointer to a RUN_REMAP class object; a pointer to a cluster allocation bitmap; a virtual cluster number specifying current position in an attribute; logical cluster numbers specifying the first cluster in a run, the middle cluster in the partition, the first cluster after the Master File Table, the cluster one-eighth into the partition, the first cluster in the Master File Table bitmap, and the first cluster in the Master File Table; integers of the Master File Table noted earlier is the added to the forbidden region to reserve that region. The center cluster is also marked forbidden. This operation defragments the Master File Table.

The rest of the system files are put at the center of the partition using SetRemapAddr and nested loops which call RemapSysAttr( ). More precisely, after calling SetRemapAttr(slcnCenter+1), each iteration of a for loop from zero to thirteen by one opens the file record segment of the next system file stored after the center, loops through the system file's attributes, and then closes the file record segment. While there are more attributes for a given system file, the code determines whether the current attribute is external. If it is not, then RemapSysAttr( ) is called once. If the attribute is external, then RemapSysAttr( ) is called inside a loop through the attribute list. The clusters from slcnCenter−1 for count clusters are added to the forbidden region, where count is the current remap address minus slcnCenter plus one. The order of the system files used in the for loop is recorded in a static array:

```
static UINT ntdefragSysOrder[14] =
{
    BOOT_FILE_NUMBER,                   // FRS 7: $Boot; not remapped
    MASTER_FILE_TABLE2_NUMBER,          // FRS 1: $MftMirr
    LOG_FILE_NUMBER,                    // FRS 2: $LogFile
    VOLUME_DASD_NUMBER,                 // FRS 3: $Volume
    ATTRIBUTE_DEF_TABLE_NUMBER,         // FRS 4: $AttrDef
    BIT_MAP_FILE_NUMBER,                // FRS 6: $BitMap
    QUOTA_TABLE_NUMBER,                 // FRS 9: $Quota
    UPCASE_TABLE_NUMBER,                // FRS 10: $UpCase
    ROOT_FILE_NAME_INDEX_NUMBER,        // FRS 5: (Root directory)
    11,
    12,
    13,
    14,
    15
};
``` specifying the current file in the Master File Table, current attribute list entry number, and attribute sequence number; and a Boolean bNew indicating whether this is the first time an attribute has been opened by this invocation of the main routine to have its runs remapped.

The NTFS main routine starts by allocating and initializing for access an object containing information about the volume holding the partition, and allocating a RUN_REMAP object. The routine then obtains a copy of the NTFS volume bitmap and adds bad sectors to the forbidden region.

The RUN_REMAP object is initialized. In particular, the free cluster count is set by SetFreeClusts(1024) and the delta is set by SetDelta(64); other values may be used in other implementations. The Master File Table bitmap is located, and the logical cluster numbers marking the start of the first cluster after the Master File Table and the cluster one-eighth of the way into the partition are determined and recorded by calling SetFirstFree( ) and SetStart( ). If the one-eighth position is less than the first free cluster, then the first free cluster position is used instead of the one-eighth position.

The SetRemapAddr( ) and RemapSysAttr( ) functions are called to put the Master File Table $BITMAP attribute at the beginning of the partition after the boot loader. Then the same two functions are called again to put the Master File Table $DATA attribute sixteen kilobytes into the partition. The entire region from logical cluster number zero to the end Next, the user files are remapped. SetRemapAddr (slcnStart) is called. Each iteration of a for loop through the user file numbers in the Master File Table checks each file record segment to determine whether it is in use; if it is not, no remapping is performed. Each file record segment in use is opened, and each of its attributes is remapped either by a loop through the attribute list with calls to RemapAttrByEntry( ) or by a call to RemapAttrByHeader( ). Then the file record segment is closed.

Unless errors have been detected and caused cancellation of the manipulation, the bNew variable is set true and the data is then moved into the new configuration in a loop through the remap map entries. The number of free clusters in the remapping map is initially compared with the number of free clusters in the NTFS bitmap, and an error is reported if the two numbers differ. The number of free clusters is also checked after each call (if any) to the Vacate( ) function and each call to the MoveRun( ) or MoveRun2( ) function. Vacate( ) is called as needed to avoid overwriting valid data stored on disk at a location that will be overwritten when a run is moved.

If bNew is true or the file number of the current remap map entry specifies a file other than the one last opened, then the map entry file record segment is opened and checked to make sure it is not external and bNew is set true. Otherwise, if bNew is true or the current remap map entry specifies an attribute or CRC other than those of the attribute last opened, then the attribute specified by the current remap map entry is opened and bNew is set false. Then MoveRun2( ) is called to move the run at the current virtual cluster number to the target logical cluster number; the length of the run is also passed in. The similar MoveRun( ) function takes a pointer to an object containing a RUN structure, plus a cluster length. The file record segment, volume bitmap, and Master File Table bitmap are then are updated, and the loop starts over with the next remap map entry. Finally, the boot sector, Master File Table, and mirror Master File Table are updated.

When replicating data or vacating regions, several aspects of manipulating partitions containing NTFS and other advanced file systems should be noted. For instance, if multiple data streams are allowed, each file must be checked for them. Thus, the software may contain an outer loop that steps through the files, with an inner loop that steps through the data, replicating or vacating the data streams. The MFT and other system structures are treated in many ways as if they were simply user files, at least as far as moving their constituent sectors is concerned. The log file and the security descriptors, for instance, are replicated and/or vacated just like user data. Compressed files are preferably not decompressed, but merely treated as bit streams.

Full support for large disks may require the use of sixty-four bit variables to hold sector numbers. Although shorter variables (such as thirty-two bit variables) may be used with many partitions on many systems 400, the larger variables are preferred. Similar considerations apply to variables that hold cluster numbers and file descriptors.

Some advanced file systems use Unicode names for files and directories. If file names are required to be kept alphabetical, for instance, during a resizing manipulation, it is necessary for the software to be capable of sorting Unicode strings. It is also desirable to be able to display Unicode names to the user in status and error messages. If the file system uses case-insensitive names, the verifying step 512 may also check the Unicode case equivalency table.

POSIX or similar file systems may create multiple names for a given file, often called "links." This should be considered during the verifying step 512, so that links do not lead to spurious error messages.

The difference between system and user areas, which is quite well defined in FAT, is blurred in NTFS and may be blurred in other advanced file systems. User data may be resident in NTFS system structures or it may be external to them. This must be kept in mind when file system structures are manipulated to avoid losing user data or damaging system integrity. Also, if all user data is resident there is no need to check for it during replication after the system structures have been copied or moved, because the resident user data will already have been copied or moved with the system structures.

The format of the balanced trees, balanced B trees, B+ trees, and other directory tree data structures used to hold directory information in advanced file systems must be reflected in the software; these structures are radically different from the directory structures used in FAT file systems, but are well-documented. Those of skill in the art will readily combine programming skills and knowledge of directory tree data structures with partition manipulation techniques of the type discussed here and in the incorporated applications in order to maintain the internal consistency and integrity of advanced file system directories during partition manipulation.

Advanced file system structures which are maintained as files may generally be relocated to new positions within a partition (new relative to an edge of the partition) just as any user file is relocated. However, some versions of NTFS store the boot sector or boot sector copy at a predetermined location, such as at one end of the partition or in the middle of the partition. Thus, when an NTFS partition is manipulated, it may be necessary to move the boot sector or boot sector copy to the corresponding location (e.g., end or middle) within the modified partition, having first ensured that the new location has been properly cleared.

Those of skill in the art will appreciate that information regarding the number of sectors involved in a partition is stored in both the partition table (see entry 306 in FIG. 3) and in file system structures such as the boot sector or the NTFS bitmap. However, these two sector counts have different interpretations. The partition table 200 defines a partition size which serves as the maximum size that can be used by the file system (including both file system structures and user data organized by the file system). By contrast, the file system structures indicate how much of the partition is actually being used by the file system. The software should not presume that the partition size shown in the sector count 306 is interchangeable with the file system size indicated by the file system structures, even though the two sizes may be the same. The partition is a container for the file system, and the file system need not completely fill that container, just as user data need not completely fill every allocated cluster.

In one embodiment, ajournal is kept in which the operations performed by the steps 512, 514 are recorded in order. This allows the same sequence of manipulation operations to be automatically repeated on another partition, thereby making it easier to modify a large number of partitions on different computers 402 in a given way. For instance, it may be desirable to canonize the partition containing the operating system on each machine. In one embodiment, the list of operations can be edited. In some embodiments, the operations can be undone, either one-by-one or all at once. This allows a user to recover the original selected partition from the modified partition. The undo facility also allows administrators to experiment with different possibilities while creating a playback sequence.

The Master File Table defragmenting step 604 may be embodied in software which is generally similar to the software for steps 600, 602. However, the specific task to be accomplished is different. When an NTFS file contains many disjoint clusters of data, the list of the file's runs may occupy more than one File Record entry. When a file is deleted or a file containing multiple File Record entries is shortened or deleted, or when a partition containing files with multiple entries is defragmented, the Master File Table will contain unused File Record entries.

Accordingly, one embodiment of the invention defragments the Master File Table by copying the entries after the unused ones over the unused ones, thus placing all the unused entries at the end. The unused clusters at the end of the Master File Table above the next multiple of 8 of the number of used entries are freed for use by the operating system. The Master File Table Bitmap is shortened to the next multiple of 64 above the number of Master File Table entries and, if it lost one or more clusters, they are also freed. The software embodying the invention also searches each directory on the partition for the File Record Numbers contained in them and changes the numbers to match the new positions of the associated files.

Likewise, the directory space reclaiming step 606 may be embodied in software which is generally similar to the software for steps 600, 602, and 604, with due attention to the differences in the specific tasks to be accomplished. With at least some versions of Windows NT, when a directory grows in number of entries and then shrinks, the space in the directory is marked unused but is still kept by the directory. The space is reclaimed by copying all the used directory blocks to the beginning of the directory and updating the pointers in the node in the B+-tree above each block that was copied to point to the new position of the block. The unused space is then all at the end of the directory and is freed for use by NTFS. The directory's usage bitmap is shortened to the next multiple of 64 bits above the number of directory entries and, if it lost one or more clusters, they are also freed.

In summary, the present invention provides a system and method for efficient, correct, and safe partition manipulations to canonize and optimize NTFS and similar partitions. Software embodying the present invention operates on multiple data streams, relocatable system structures, log files, bit maps, bad cluster files, links, caches, directory tree data structures, Unicode names, large disk cluster and sector variables, resident attributes, volume sets, and other aspects of advanced file systems in ways that preserve the internal consistency and integrity of system and user data without requiring unnecessary movement of that data.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to manipulate partitions substantially as described herein.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods. Unless otherwise stated, any list of included items is exemplary, not exclusive of other items; "includes" means "comprises" not "consists of." claimed method steps may be performed in orders other than those stated, including being performed concurrently, unless one step depends on the results of another step; steps may also be repeated.

The invention may be embodied in other specific forms without departing from its essential characteristics. The described embodiments are to be considered in all respects is only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A system for manipulating at least one formatted disk partition containing an advanced file system, the system comprising:

a computer having a processor, a memory, and a partitionable storage medium; and a means for canonizing at least one formatted partition in-place by relocating at least a portion of a system file on the storage medium to a location at or near a predetermined canonical location.

2. The system of claim 1, wherein the partition is an NTFS partition.

3. The system of claim 2, wherein the means for canonizing the partition in-place comprises a means for defragmenting a Master File Table in-place.

4. The system of claim 1, wherein the means for canonizing the partition in-place comprises a means for defragmenting a file in-place.

5. A system for manipulating at least one formatted disk partition, comprising:

a computer having a processor, a memory, and a partitionable storage medium holding an NTFS formatted partition; and a means for optimizing the NTFS formatted partition in-place by reclaiming directory space.

6. A system for manipulating at least one formatted disk partition containing an advanced file system, the system comprising:

a computer having a processor, a memory, and a partitionable storage medium; and a means for defragmenting system files in the formatted partition in-place.

7. The system of claim 6, wherein the partition is an NTFS partition.

8. A computer-implemented method for manipulating at least one formatted disk partition containing an advanced file system, the method comprising the steps of:

selecting a formatted partition which holds at least part of the advanced file system and is located on at least one disk attached to a disk drive, the partition having a left edge and a right edge and containing a plurality of sectors organized according to an advanced file system into user data and system data; and modifying the selected partition in-place to produce a modified partition by canonizing the file system in the selected partition, the modified partition having at least one different system file location than the selected partition and being organized according to the same advanced file system as the selected partition.

9. The method of claim 8, further comprising the step of gaining exclusive write access to the selected partition prior to the modifying step.

10. The method of claim 8, further comprising the step of rebooting after the modifying step.

11. The method of claim 8, wherein the modifying step comprises avoiding bad sectors.

12. The method of claim 8, further comprising the step of verifying the integrity and consistency of file system data in at least one of the selected partition and the modified partition.

13. The method of claim 8, wherein the selecting step comprises selecting an NTFS partition.

14. The method of claim 8, wherein the modifying step comprises preserving at least one copy of all user data on the disk at all times during the modifying step, thereby reducing the risk of loss of user data if operation of the disk drive is temporarily interrupted during the modifying step.

15. The method of claim 8, wherein the modifying step further comprises the step of defragmenting at least one file in the selected partition.

16. The method of claim 15, wherein the defragmenting step defragments an NTFS Master File Table.

17. The method of claim 8, further comprising the step of optimizing storage in the selected partition by reclaiming directory space.

18. The method of claim 8, wherein the modifying step comprises distinguishing between resident attributes and external attributes in an NTFS partition.

19. The method of claim 8, wherein the modifying step comprises checking for multiple data streams in a file.

20. The method of claim 8, wherein the modifying step comprises determining whether the file system is in an unknown state.

21. The method of claim 8, wherein the modifying step comprises disabling caching.

22. The method of claim 8, wherein the modifying step is initiated remotely from another computer.

23. The method of claim 8, further comprising the step of recording operations performed on the selected partition.

24. The method of claim 23, farther comprising the step of repeating the recorded operations on a second selected partition to produce a second modified partition.

25. The method of claim 23, further comprising the step of sequentially undoing at least one recorded operation on the modified partition.

26. The method of claim 8, wherein the modifying step comprises determining whether the selected partition is in a file system stored on more than one disk.

27. A computer storage medium having a configuration that represents data and instructions which will cause at least a portion of a computer system to perform method steps for manipulating an NTFS formatted disk partition, the method comprising the steps of:

selecting a formatted partition which holds at least part of an NTFS file system and is located on a disk attached to a disk drive, the selected partition having a left edge and a right edge and containing a plurality of sectors organized according to the NTFS file system into user data and system data; and modifying the selected partition in-place to produce a modified partition by canonizing the NTFS file system in the selected partition.

28. A computer storage medium having a configuration that represents data and instructions which will cause at least a portion of a computer system to perform method steps for manipulating an NTFS formatted disk partition, the method comprising the steps of:

selecting a formatted partition which holds at least part of an NTFS file system and is located on a disk attached to a disk drive, the selected partition having a left edge and a right edge and containing a plurality of sectors organized according to the NTFS file system into user data and system data; and modifying the selected partition in-place to produce a modified partition by defragmenting at least one user file in the selected partition.

29. A computer storage medium having a configuration that represents data and instructions which will cause at least a portion of a computer system to perform method steps for manipulating an NTFS formatted disk partition, the method comprising the steps of:

selecting a formatted partition which holds at least part of an NTFS file system and is located on a disk attached to a disk drive, the selected partition having a left edge and a right edge and containing a plurality of sectors organized according to the NTFS file system into user data and system data; and modifying the selected partition in-place to produce a modified partition by defragmenting a Master File Table of the selected partition.

30. A computer storage medium having a configuration that represents data and instructions which will cause at least a portion of a computer system to perform method steps for manipulating an NTFS formatted disk partition, the method comprising the steps of:

selecting a formatted partition which holds at least part of an NTFS file system and is located on a disk attached to a disk drive, the selected partition having a left edge and a right edge and containing a plurality of sectors organized according to the NTFS file system into user data and system data; and modifying the selected partition in-place to produce a modified partition by reclaiming directory space in the selected partition.

\* \* \* \* \*